(12) United States Patent
Moulsley et al.

(10) Patent No.: US 7,583,636 B2
(45) Date of Patent: Sep. 1, 2009

(54) RADIO COMMUNICATION SYSTEM

(75) Inventors: Timothy J. Moulsley, Caterham (GB); Matthew P. J. Baker, Canterbury (GB); Bernard Hunt, Redhill (GB)

(73) Assignee: Koninklijke Philips Electronic N.V., Eindhoven (NL)

( * ) Notice: Subject to any disclaimer, the term of this patent is extended or adjusted under 35 U.S.C. 154(b) by 1431 days.

(21) Appl. No.: 10/078,980

(22) Filed: Feb. 19, 2002

(65) Prior Publication Data

US 2002/0114291 A1 Aug. 22, 2002

(30) Foreign Application Priority Data

Feb. 21, 2001 (GB) ................................. 0104220.9
May 10, 2001 (GB) ................................. 0111407.3

(51) Int. Cl.
*H04L 7/00* (2006.01)

(52) U.S. Cl. .................. 370/332; 370/252; 455/522

(58) Field of Classification Search ................ 370/332, 370/252; 455/522
See application file for complete search history.

(56) References Cited

U.S. PATENT DOCUMENTS

| | | | |
|---|---|---|---|
| 5,710,976 A | 1/1998 | Hill et al. | 455/56.1 |
| 5,995,496 A | 11/1999 | Honkasalo et al. | 370/318 |
| 6,169,731 B1 * | 1/2001 | Stewart et al. | 370/332 |
| 6,714,788 B2 * | 3/2004 | Voyer | 455/453 |
| 6,757,263 B1 * | 6/2004 | Olds | 370/315 |
| 6,801,512 B1 * | 10/2004 | Cudak et al. | 370/332 |
| 6,839,325 B2 * | 1/2005 | Schmidl et al. | 370/242 |
| 7,072,309 B2 | 7/2006 | Xie et al. | |
| 7,379,434 B2 | 5/2008 | Moulsley et al. | |

FOREIGN PATENT DOCUMENTS

| | | |
|---|---|---|
| DE | 10360533 B3 | 7/2005 |
| EP | 1032237 A1 | 8/2000 |
| EP | 1032237 A1 | 8/2000 |
| JP | 04158504 A | 6/1992 |
| JP | 09167992 A | 6/1997 |
| JP | 10013338 A | 1/1998 |

(Continued)

OTHER PUBLICATIONS

U.S. Appl. No. 10/043,532, filed Jan. 11, 2002, Inventors: Matthew P. Baker et al., Entitled: Radio Communication System Patent Application Pending in USPTO.

(Continued)

*Primary Examiner*—Duc C Ho

(57) ABSTRACT

A radio communication system comprises a secondary station having a communication channel with a primary station for the transmission of data packets from the primary station to the secondary station. In response to receipt of a data packet, the secondary station transmits a combined acknowledgement and quality parameter signal (402) to the primary station. The signal (402) indicates whether the data packet was received correctly and the value of the quality parameter enables the primary station to select transmission parameters for further data transmissions. A range of formats for the combined signal are possible.

In one embodiment the quality parameter is a site selection signal indicating a preferred subset of primary stations for subsequent data transmissions. In another embodiment the quality parameter relates to the quality of the radio link and enables the primary station to select suitable modulation and coding schemes and/or transmit power levels.

16 Claims, 3 Drawing Sheets

FOREIGN PATENT DOCUMENTS

| | | |
|---|---|---|
| JP | 10013339 A | 1/1998 |
| JP | 10065612 A | 3/1998 |
| JP | 10079776 A | 3/1998 |
| JP | 2000151619 A | 5/2000 |
| WO | WO0122645 | 3/2001 |
| WO | WO 0122645 A1 | 3/2001 |
| WO | WO 2006051677 A1 | 5/2006 |
| WO | WO 2008116307 A1 | 10/2008 |

OTHER PUBLICATIONS

Tanenbaum A, "Computer networks. Network architectures", Computer Networks, pp. 9-27, Englewood Cliffs, Prentice Hall, US, XP002071762.

* cited by examiner

RADIO COMMUNICATION SYSTEM

FIELD OF THE INVENTION

The present invention relates to a radio communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other mobile radio systems.

BACKGROUND OF THE INVENTION

There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links are not appropriate. To meet this requirement in UMTS, a High-Speed Downlink Packet Access (HSDPA) scheme is being developed which may facilitate transfer of packet data to a mobile station at up to 4 Mbps.

There are a number of parameters which a Base Station (BS) needs to set for the first transmission of a packet, as well as for subsequent transmissions and retransmissions. Such parameters may include the transmission power, Modulation and Coding Scheme (MCS), spreading factor and number of channelisation codes (in a spread-spectrum system such as UMTS), and delay between retransmissions of a particular packet (or the transmission priority assigned for retransmissions).

In known radio communication systems, at any one time a MS generally communicates with a single Base Station. During the course of a call the MS may wish to investigate transferring to another BS, for example when the quality of the communication link deteriorates as the MS moves away from its BS, or when the relative traffic loading of different cells requires adjusting. The process of transferring from one BS to another is known as handover.

In a system operating according to the current UMTS specifications, the MS maintains a list of BSs known as the "active set" with which it is expected that radio links of reasonable quality can be maintained. When the MS is in dedicated channel mode, and there are multiple BSs in the active set, the MS is in "soft handover" with the BSs in the active set. In this mode uplink transmissions are received by all BSs in the active set, and all BSs in the active set transmit substantially the same downlink information to the MS (typically the data and most of the control information would be the same, but power control commands could be different). A drawback of this "soft handover" approach is that the uplink and downlink transmission powers cannot be optimised for each individual radio link, as only one set of power control commands is transmitted in the uplink, while the power control commands transmitted over the downlink from different BSs may result in conflicting requirements for the uplink transmission power.

The normal soft handover procedure is particularly suitable for real time services such as voice links, where a continuous connection must be maintained. For packet data links, however, it can be advantageous to select the optimum BS for the transmission of each data packet to a MS, to allow for dynamically changing radio link and traffic conditions. Improved system throughput can be achieved if the selection of the optimum BS is made immediately prior to transmission of each packet, minimising the number of packets received in a corrupted state and also minimising total transmitted power per packet.

A problem with the process of fast site selection, as outlined above, is that it may interact badly with the design of an ARQ (Automatic Repeat reQuest) process. An example of such an interaction arises if the selected BS is changed before a data packet has been correctly received. A further problem with a packet data system is the need for signalling a plurality of separate sets of parameters relating to packet transmission.

SUMMARY OF THE INVENTION

An object of the present invention is therefore to provide an improved signalling mechanism.

According to a first aspect of the present invention there is provided a radio communication system having a communication channel between a secondary station and a primary station, the secondary station having receiving means for receiving data from the primary station, acknowledgement means for transmitting a signal to the primary station to indicate whether or not the data was received correctly and parameter signalling means for determining a quality parameter relating to packet transmission and for signalling details of the quality parameter to the primary station, thereby enabling selection of a transmission parameter for subsequent data transmissions, wherein combined signalling is performed by the acknowledgement means and the parameter signalling means transmitting a single code word selected from a plurality of available code words and wherein the primary station has means for receiving the single code word and using the code word in determining whether or not the data was received correctly and the value of the quality parameter.

By combining acknowledgement and quality parameter signals in a single code word, improved operational efficiency is enabled since a reduced set of signals may be used.

The single code word may be transmitted as a plurality of parts, for example divided between a plurality of time slots in a frame. The available code words will comprise a plurality of quality parameter signals and may further comprise, for example, an acknowledgement signal, or a negative acknowledgement signal, or a negative acknowledgement signal and an abort signal. In this context an abort signal could indicate that the transmission attempt for that packet should be terminated.

In one embodiment the secondary station has communication links with a plurality of primary stations and the quality parameter is a site selection signal for indicating a preferred subset of the primary stations for subsequent data transmissions. In this embodiment, a further advantage of using a single code word is that both acknowledgement and site selection signals automatically have the same error rate, whatever the number of available primary stations.

In another embodiment the quality parameter is a channel quality metric, enabling the primary station to determine one or more of the modulation and coding schemes and/or power level to be used for transmission of the next packet. This embodiment may optionally be combined with the site selection embodiment.

According to a second aspect of the present invention there is provided a primary station for use in a radio communication system having a communication channel between a secondary station and the primary station, wherein means are provided for transmitting data to the secondary station, for receiving from the secondary station a single code word, selected from a plurality of available code words, for using the code word in determining whether or not the data was received correctly and the value of a quality parameter, and for determining the value of a transmission parameter for subsequent data transmissions depending on the value of the quality parameter.

According to a third aspect of the present invention there is provided a secondary station for use in a radio communication system having a communication channel between the secondary station and a primary station, wherein receiving means are provided for receiving data from the primary station, acknowledgement means are provided for transmitting a signal to the primary station to indicate whether or not the data was received correctly and parameter signalling means are provided for determining a quality parameter relating to packet transmission and for signalling details of the quality parameter to the primary station, thereby enabling selection of a transmission parameter for subsequent data transmissions, wherein combined signalling is performed by the acknowledgement means and the parameter signalling means transmitting a single code word selected from a plurality of available code words.

According to a fourth aspect of the present invention there is provided a method of operating a radio communication system having a communication channel between a secondary station and a primary station, the method comprising the secondary station receiving data from the primary station, transmitting an acknowledgement signal to the primary station to indicate whether or not the data was received correctly, determining a quality parameter relating to packet transmission and signalling details of the quality parameter to the primary station, thereby enabling selection of a transmission parameter for subsequent data transmissions, wherein combined acknowledgement and quality parameter signalling is performed by transmitting a single code word selected from a plurality of available code words and wherein the primary station receives the single code word and uses the code word in determining whether or not the data was received correctly and the value of the quality parameter.

The present invention is based upon the recognition, not present in the prior art, that improved operation of a data transmission system is enabled by combining signalling for acknowledgement information and quality parameters.

BRIEF DESCRIPTION OF THE DRAWINGS

Embodiments of the present invention will now be described, by way of example, with reference to the accompanying drawings, wherein.

In the drawings the same reference numerals have been used to indicate corresponding features.

DETAILED DESCRIPTION OF THE INVENTION

Figure 1:
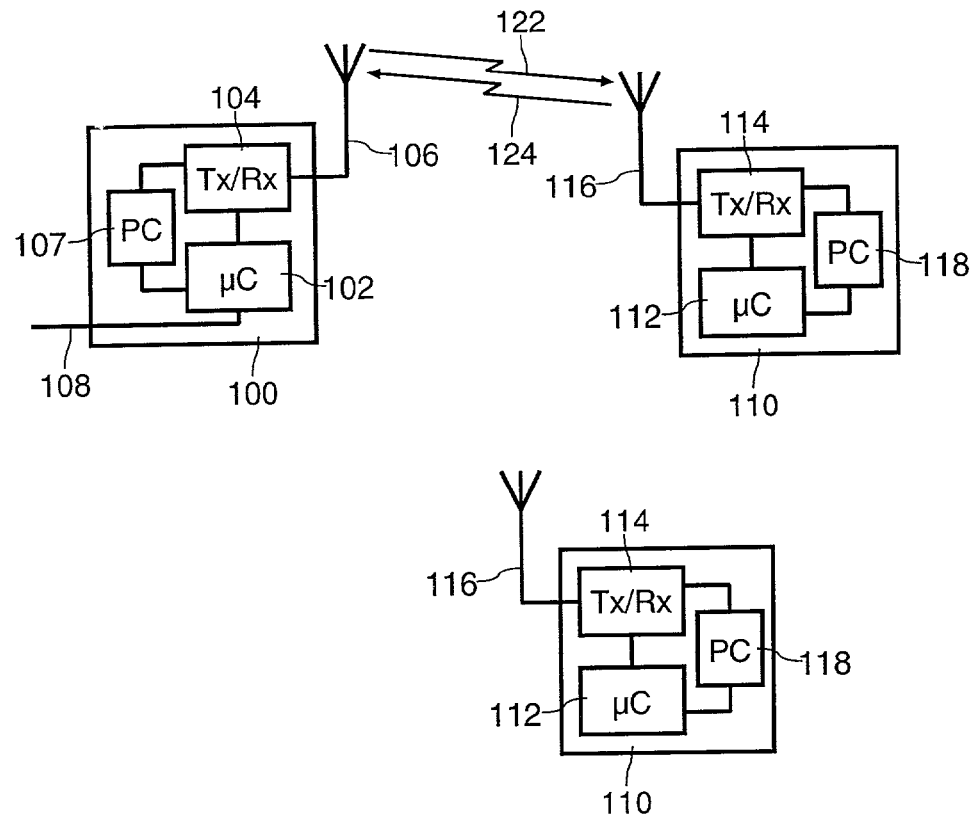
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
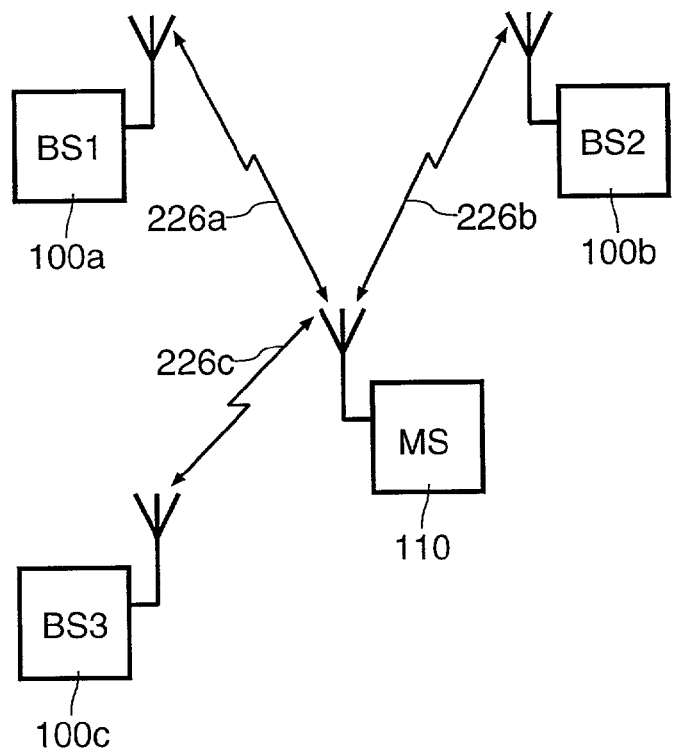
FIG. 2 is a block schematic diagram of a radio communication system with a MS in the process of soft handover.

A MS 110 engaged in a soft handover process is illustrated in FIG. 2, the MS 110 having three two-way communication channels 226*a*,226*b*,226*c*, each comprising an uplink and a downlink channel, with three respective BSs 100*a*, 100*b*, 100*c*. In a given time slot the MS 110 receives substantially the same data from each of BSs 100*a*, 100*b*, 100*c* on the downlink channels, and transmits the same data to each of the BSs on the uplink channels. In a conventional UMTS system, each MS 110 receives power control commands determined individually by each of the BSs 100*a*, 100*b*, 100*c* in the active set, but only transmits one set of uplink power control commands to all BSs.

In a modified version of such a system, disclosed in our co-pending unpublished United Kingdom patent application 0103716.7 (Applicant's reference PHGB010022), a MS 110 operates parallel power control loops with each of the BSs 100*a*, 100*b*, 100*c*. This modification is particularly useful for HSDPA, in which each data packet is transmitted to the MS 110 from one of the BSs 100*a*, 100*b*, 100*c*, because it enables selection of the best BS on a per-packet basis.

Figure 3:
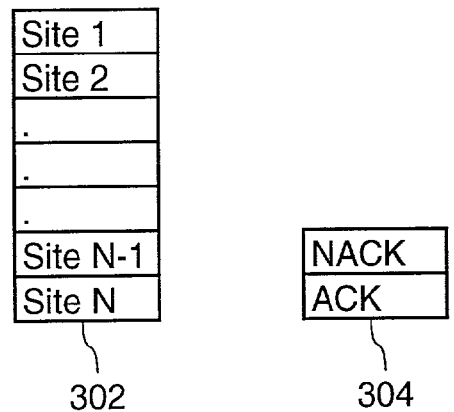
FIG. 3 is a diagram of known UMTS site selection and acknowledgement fields.

A proposed embodiment of a HSDPA system for UMTS employs a modified frame structure (with a duration which is a small sub-multiple of a standard 10 ms UMTS frame). The packet duration is the same as the frame duration. FIG. 3 illustrates possible data values for each of two data fields included in the frame, a site selection field 302 (site selection being the quality parameter in this embodiment) and an acknowledgement field 304. The contents of the site selection field 302 can take one of N possible values, indicating to the infrastructure which BS 100*a*, 100*b*, 100*c* should be used for transmission of the next packet. Typically the selection of a BS would be based on measurements of a downlink common pilot channel. In some systems the indication by the MS 110 of a preferred BS 100*a*, 100*b*, 100*c* may not actually result in that BS becoming selected since the network may take other factors into consideration. Such factors could include load balancing between BSs 100*a*, 100*b*, 100*c* and optimisation of overall system throughput. The contents of the acknowledgement field 304 can take one of two possible values, ACK and NACK, where ACK indicates that the most recent packet was received correctly, and NACK indicates that it was not received correctly.

Operation of the system is much simpler if the selected site is not updated before a failed packet is successfully re-transmitted. Hence, it is inefficient to send both ACK/NACK and site selection in separate data fields, since not all combinations may be needed. In particular, if change of transmission site during an ARQ cycle is prohibited, then site selection information need not be sent at the same time as a NACK.

A further problem is that if the two fields 302, 304 are transmitted with the same power level, the relative error rates for the two messages will depend on the number of BSs in the active set. This could be corrected by using different powers for the two data fields, but this may be difficult to arrange and is not currently allowed by the UMTS specifications.

One solution might be simply not to transmit any data field which is currently not being used. However, this could give rise to detection reliability problems. In any case this is not currently allowed for UMTS FDD (Frequency Division Duplex) terminals, since it is generally desirable to maintain constant envelope transmission in the uplink for EMC reasons.

Figure 4:
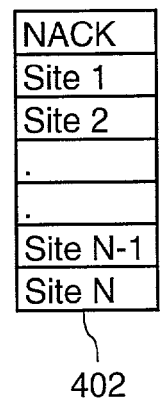
FIG. 4 is a diagram of a first embodiment of a combined site selection and acknowledgement field.

In a system made in accordance with the present invention, a single data field is used to convey both acknowledgement and site selection information. FIG. 4 illustrates a first embodiment of a combined field 402 with a possible set of data values. In this embodiment, transmission of anything other than a NACK in the combined field 403 implies that the last packet was received correctly. If the active set consisted of N BSs, then N+1 different code words would be needed.

A coding scheme similar to that used for TFCI (Transport Format Combination Indicator) in UMTS could be used, in which each possible data value is mapped to a defined 30 bit code word. This scheme also works if there is only one BS in the active set, since it is then equivalent to the conventional ACK/NACK. A further advantage of such a scheme is that because one code word is used, there is no need to balance the relative error rates between ACK/NACK and site selection messages. As it is not necessary to send an ACK or NACK unless a packet has actually been transmitted, it may also be desirable to define an additional code word to indicate that there is no information to be signalled in the combined data field 402. In systems without the need for constant envelope transmissions, the need for an additional code word could be avoided by transmitting nothing when there is no information to be signalled.

Figure 5:
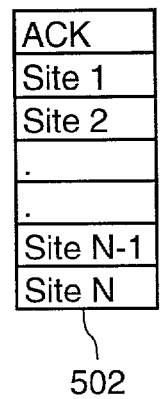
FIG. 5 is a diagram of a second embodiment of a combined site selection and acknowledgement field.

A range of alternative schemes are possible. For example, FIG. 5 illustrates a second embodiment of a combined field 502, in which the transmission of any site selection indication functions as an implicit NACK.

In this embodiment, a normal NACK could be implied by sending a site selection message for the current BS 100. The site selection message for any other BS would be treated as ABORT, terminating the ARQ process. This means that under bad channel conditions, a new site could be selected without waiting for a large number of NACKs to be sent. An advantage of this embodiment is that the ARQ procedure can be aborted more rapidly than in other proposed schemes, for example those placing a limit on the maximum allowed number of re-transmissions. Such a scheme could even be used in the known site selection and acknowledgement scheme of FIG. 3, by specifying that sending a NACK at the same time as selection of a different site to that currently transmitting constitutes an ABORT. This would overcome some of the disadvantages of the known scheme.

This approach makes the meaning of the data fields context dependent (i.e. dependent on previously transmitted values). The context could also include information transmitted on other channels.

The specific meaning of the ABORT message may depend on the particular embodiment. For example, as described above, it may indicate that the transmission of the current packet should be abandoned. It could also indicate that the further transmission of packets should be abandoned. Typically, an ABORT would additionally imply that reception of the current packet was unsuccessful. There may be more than one criterion for sending an ABORT. For example, it could be sent because the MS 110 has determined that the channel quality has deteriorated too much, or, in the case of delay sensitive applications, some time-out period has been exceeded.

Figure 6:
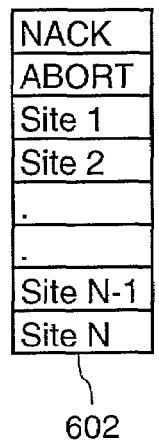
FIG. 6 is a diagram of a third embodiment of a combined site selection and acknowledgement field.

One possible problem with the second embodiment is that there could be some delay between sending an ACK and selecting a new site, as a second message (for site selection) would have to be transmitted after an ACK. FIG. 6 illustrates a third embodiment of a combined field 602, in which this problem is solved by adding an ABORT message to the original set of possible signals.

In summary, in an embodiment of the present invention based on HSDPA for UMTS it would necessary to define a coding scheme (possibly like that used for TFCI) which could be used to map the desired signals to a combined data field 402, 502, 602 in a control channel.

Figure 7:
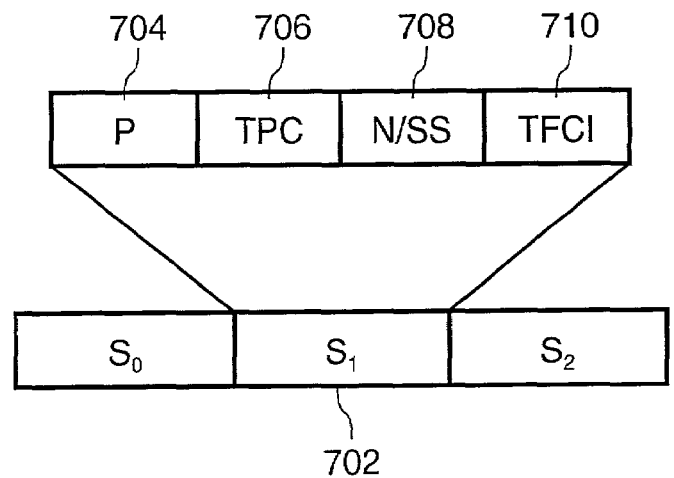
FIG. 7 is a diagram of an embodiment of a frame and slot structure.

FIG. 7 illustrates one possible uplink frame structure for the control channel. In this embodiment, a frame 702 has a duration of 2 ms and comprises three slots, $S_0$, $S_1$ and $S_2$, of equal duration. Each slot comprises four data fields: a pilot field (P) 704, comprising known symbols for channel estimation; a power control field (TPC) 706, comprising power control commands; a combined acknowledgement and site selection field (N/SS) 708; and a Transport Format Combination Indicator (TFCI) field 710.

One power control command could be sent in every slot. The N/SS information from the three slots $S_0, S_1, S_2$ in the frame 702 is combined to form one code word. The TFCI information (if present) would be combined over 5 frames (i.e. 10 ms), to indicate the format of any data sent in the uplink. Note that the method of sending uplink data may be the same in HSDPA as for a normal UMTS dedicated channel (DCH).

Another embodiment of the present invention relates to signalling of a quality parameter relating to link quality instead of site selection information. In this embodiment the MS 110 may have a communication link with a single BS 100 (in which case no site selection information is required) or, as in the above embodiments, with a plurality of BSs 100 (in which case site selection information may be required). The link quality information enables the BS 100 to determine which Modulation/Coding Scheme (MCS) and/or power level should be used for transmission of the next packet. Methods of deriving appropriate link quality information are well known. For example, in a UMTS HSDPA embodiment the quality information could be based on measurements of SIR (Signal to Interference Ratio) on a downlink common pilot channel or a dedicated channel. As another example, if a packet is received without a CRC error (i.e. the data is known), this knowledge could be used to improve the accuracy of the quality information. As a further example the MS 110 could signal explicitly the MCS it required. Similarly if an NACK is received, this also implies something about the channel quality.

As presently proposed, acknowledgement and link quality information are signalled separately, in a similar manner to that described for site selection information in relation to FIG. 3 with the site selection field 302 replaced by a link quality field which can take one of N possible values. However, the operation and implementation of the system is much simpler if the MCS not updated when a failed packet is retransmitted. Hence, if the acknowledgement field in 304 response to transmission of a particular packet is a ACK, the link quality information is used to determine the MCS for the next packet. In contrast, if the packet is not received correctly and a NACK is transmitted, the packet is retransmitted using the same MCS as the original transmission.

This proposed scheme suffers from a similar problem to the site selection scheme discussed above, in that it is inefficient to send both ACK/NACK and quality in separate data fields, since not all combinations may be needed. Essentially, if change of MCS during an ARQ cycle is prohibited, then quality information need not be sent at the same time as a NACK. A further problem, similar to that of the site selection embodiments above, is that if the acknowledgement and quality fields are transmitted with the same power level, the relative error rates for the two messages will depend on the number of possible quality levels to be signalled. This could be corrected by using different powers for the two data fields, but this is not currently allowed by the UMTS specifications.

Hence, in an embodiment of a system made in accordance with the present invention, a single data field is used to convey both acknowledgement and link quality information. A first embodiment of a combined field is based on that illustrated in FIG. 4, with data values indicating site selection in FIG. 4 replaced by data values indicating particular link quality information. In this embodiment, transmission of anything other than a NACK in the combined data field indicates that the last data packet was received correctly. If N different quality levels can be signalled, then N+1 different code words would be needed. Other aspects of the embodiment are identical to those discussed above. A second embodiment of a combined field is based on that illustrated in FIG. 6, in which an ABORT message is added to the original set of possible signals to terminate the ARQ sequence early.

An uplink frame structure similar to that illustrated in FIG. 7 could also be used for the link quality embodiment, with the combined acknowledgement and site selection field 708 replaced with a combined acknowledgement and link quality field.

Figure 8:
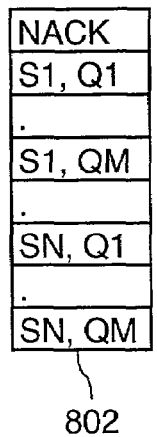
FIG. 8 is a diagram of a combined site selection, link quality and acknowledgement field.

It will also be appreciated that the site selection and link quality embodiments could be combined. FIG. 8 illustrates an example of a embodiment of a combined site selection and link quality field 802, in which N sites (S1 to SN) and M link quality values (Q1 to QM) can be signalled. As with the embodiment shown in FIG. 4, transmission of anything other than a NACK in the combined field 802 indicates that the last packet was received correctly. In this example a total of N×M code words would be needed, so it will be appreciated that in a typical embodiment some combinations of site and link quality values would probably have to be forbidden to avoid the problem of an excessively large number of combinations. However, in some circumstances the ability to trade off numbers of signallable sites against numbers of signallable link qualities could provide greater flexibility. This is particularly the case where different BSs 100 support different sets of MCS.

The number of valid code words and the meaning of each possible code word may be defined when the radio channel is set up or reconfigured. The meaning of each word may be context dependent, for example the number of possible quality parameter values may vary with the number of BSs 100 in the active set. Further, signalling of some quality parameters may convey an implicit acknowledgement while signalling of others may convey an implicit NACK.

Additionally, the contents and size of the set of possible quality parameters may depend on whether the packet was received correctly. For example, if a packet is received incorrectly the range of quality values which need to be signalled may correspond to lower quality values than if the packet is received correctly. The number of quality values which can be signalled may also be different in these two cases.

The description above related to the BS 100 determining appropriate settings for transmission parameters. In practice the setting of transmission parameter values may be the responsibility of a variety of parts of the fixed infrastructure, for example in a "Node B", which is the part of the fixed infrastructure directly interfacing with a MS 110, or at a higher level in the Radio Network Controller (RNC). In this specification, the use of the term "base station" or "primary station" is therefore to be understood to include the parts of the network fixed infrastructure responsible for the determining and setting of transmission parameter values.

Although the embodiments described above have been in terms of a UMTS FDD system, the present invention is not restricted to use in such a system and may be applied in a wide range of systems, for example including TDD (Time Division Duplex).

In practice the amount of data transmitted before BS selection is performed again may be more than one packet, depending on the system overheads of changing the transmitting BS.

In the site selection embodiments described above the data channel is transmitted to the MS 110 from one BS at a time. However, it may be advantageous in some circumstances for data channels to be transmitted simultaneously from more than one BS. For example, in a situation where three BSs 100a, 100b, 100c are under closed loop power control, if two of the BSs provide an equally good link quality the data packet or packets may be transmitted concurrently from those two base stations (in a similar manner to transmissions during soft handover). In this case the set of available site selection words could also include words which indicated the selection of a plurality of BSs.

In a variation on the embodiments described above, there could be more than one data link between a primary and a secondary station. For example, the invention could be applied to radio links at different frequencies which therefore require separate power control even if they are between the same pair of stations.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system having a communication channel between a secondary station and a primary station, the secondary station having receiving means for receiving data from the primary station, acknowledgement means for transmitting a signal to the primary station to indicate whether or not the data was received correctly and parameter signalling means for determining a quality parameter relating to packet transmission and for signalling details of the quality parameter to the primary station, wherein combined signalling is performed by the acknowledgement means and the parameter signalling means transmitting a single code word selected from a plurality of available code words and wherein the primary station has means for receiving the single code word and using the code word in determining whether or not the data was received correctly and the value of the quality parameter.

2. A secondary station for use in a radio communication system having a communication channel between the secondary station and a primary station, wherein receiving means are provided for receiving data from the primary station, acknowledgement means are provided for transmitting a signal to the primary station to indicate whether or not the data was received correctly and parameter signalling means are provided for determining a quality parameter relating to packet transmission and for signalling details of the quality parameter to the primary station, wherein combined signalling is performed by the acknowledgement means and the parameter signalling means transmitting a single code word selected from a plurality of available code words.

3. A secondary station as claimed in claim 2, characterised in that means are provided for separating the single code word into a plurality of parts and for transmitting separately each of the plurality of parts.

4. A secondary station as claimed in claim 2, characterised in that the available code words consist of a negative acknowledgement signal, for indicating that the data was not received correctly, and for indicating at least one quality parameter.

5. A secondary station as claimed in claim 2, characterised in that the available code words consist of an acknowledgement signal, for indicating that the data was received correctly, and for indicating at least one quality parameter.

6. A secondary station as claimed in claim 2, characterised in that the available code words consist of a necative acknowledgement signal, an abort signal, for indicating that the primary station should not attempt retransmission of the data, and for indicating at least one quality parameter.

7. A secondary station as claimed in claim 2, characterised in that the system comprises communication channels between the secondary station and a plurality of primary stations, in that the receiving means are adapted for receiving data from one or more primary stations selected from the plurality of primary stations, and in that the quality parameter is a site selection signal indicating a preferred subset of the primary stations for subsequent data transmissions, thereby enabling selection of primary stations for subsequent data transmissions.

8. A secondary station as claimed in claim 2, characterised in that the quality parameter relates to the quality of the radio link used for data transmission, thereby enabling the primary station to select suitable modulation and coding schemes and/or transmission power for subsequent data transmissions.

9. A method of operating a radio communication system having a communication channel between a secondary station and a primary station, the method comprising the secondary station receiving data from the primary station, transmitting an acknowledgement signal to the primary station to indicate whether or not the data was received correctly determing a quality parameter relating to packet transmission and signalling details of the quality parameter to the primary station, wherein combined acknowledgement and quality parameter signalling is performed by transmitting a single code word selected from a plurality of availabe code words and wherein the primary station receives the single code word and uses the code word in determining whether or not the data was received correctly and the value of the quality parameter.

10. A method as claimed in claim 9, characterised by the secondary station separating the single code word into a plurality of parts and transmitting separately each of the plurality of parts and by the primary station receiving each of the plurality of parts and combining them to determine the received code word.

11. A method as claimed in claim 9, characterised by the system comprising communication channels between the secondary station and a plurality of primary stations, by the method comprising the secondary station receiving data from one or more primary stations selected from the plurality of primary stations and determining a preferred subset of the primary stations which are most suitable for subsequent data transmissions, by the quality parameter being a site selection signal indicating the preferred subset of primary stations, and by each primary station determining from the site selection signal whether or not it is selected for further data transmissions.

12. A method as claimed in claim 11, characterised by the code word indicating a singal member of the preferred subset of primary stations.

13. A method as claimed in claim 11, characterised by of the selected primary station being member of the preferred subset of primary stations.

14. A primary station for use in a radio communication system having a communication channel between a secondary station and the primary station, comprising:
   a transceiver for transmitting data to the secondary station and receiving from the secondary station a single code word, selected from a plurality of available code words, said transceiver using the code word in determining whether the data was received correctly and the value of a quality parameter, said transceiver determining the value of a transmission parameter for subsequent data transmissions depending on the value of the quality parameter, wherein the quality parameter is a site selection signal indicating a preferred subset of the primary stations for subsequent data transmissions and it is determined from the site selection signal whether the primary station is selected for further data transmissions.

15. The primary station of claim 14, wherein said transceiver receives the single code word as a plurality of parts, each of the parts being combined to determine the received code word.

16. The primary station of claim 14, wherein the quality parameter relates to the quality of the radio link used for data transmission, and modulation, coding schemes and/or transmission power are selected for subsequent data transmissions in response to the link quality parameter.

* * * * *